United States Patent
Greenfield et al.

(10) Patent No.: US 7,552,236 B2
(45) Date of Patent: Jun. 23, 2009

(54) ROUTING INTERRUPTS IN A MULTI-NODE SYSTEM

(75) Inventors: Todd Alan Greenfield, Rochester, MN (US); Jon K. Kriegel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 11/181,710

(22) Filed: Jul. 14, 2005

(65) Prior Publication Data

US 2007/0038818 A1 Feb. 15, 2007

(51) Int. Cl.
G06F 15/173 (2006.01)
G06F 9/46 (2006.01)

(52) U.S. Cl. ..................... 709/238; 718/103

(58) Field of Classification Search .............. 709/238, 709/239, 240; 710/48, 260, 264, 268; 719/311, 719/313; 718/103
See application file for complete search history.

(56) References Cited

U.S. PATENT DOCUMENTS

| | | | |
|---|---|---|---|
| 6,205,508 B1 * | 3/2001 | Bailey et al. ................ 710/260 |
| 6,658,485 B1 * | 12/2003 | Baber et al. ................ 719/314 |
| 6,684,280 B2 * | 1/2004 | Chauvel et al. ............ 710/244 |
| 6,823,512 B1 * | 11/2004 | Miller et al. ................ 718/103 |
| 6,928,647 B2 * | 8/2005 | Sager ........................ 718/108 |
| 7,207,040 B2 * | 4/2007 | Boudnik et al. ............ 718/103 |
| 2003/0061423 A1 * | 3/2003 | Rankin et al. .............. 710/260 |
| 2004/0034856 A1 * | 2/2004 | Boudnik et al. ............ 718/103 |
| 2007/0143514 A1 * | 6/2007 | Kaushik et al. ............ 710/260 |

* cited by examiner

Primary Examiner—J Bret Dennison
(74) Attorney, Agent, or Firm—Owen J. Gamon (57) ABSTRACT

A method, apparatus, system, and signal-bearing medium that, in an embodiment, detect a new task priority for a processor, where the processor is connected to a first node, find a home node for the processor via a cluster to which the processor belongs, and send the new task priority to the home node if the home node is different from the first node. In another embodiment, an interrupt directed to a first processor is detected, the interrupt is determined to be redirectable, a home node for the first process is found via a cluster to which the first processor belongs, and an interrupt vector is sent to the home node if the home node is different from the first node.

13 Claims, 7 Drawing Sheets

ROUTING INTERRUPTS IN A MULTI-NODE SYSTEM

FIELD

This invention generally relates to computer systems and more specifically relates generally to routing interrupts in a multi-node system.

BACKGROUND

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

One technique for increasing the power of computer systems is often referred to as symmetric multiprocessing (SMP), which is an architecture in which multiple processors share the same memory. One of the processors typically loads the operating system, which brings the other processors online. The operating system uses the multiple processors as a pool of processing resources, all executing simultaneously, either processing data or in an idle loop waiting for a task to execute.

One advantage of SMP systems is scalability, in that as the need for processing power increases, additional processors may be added. A second advantage is high availability or fault resistance, in that clusters of two or more SMP systems may be used, where if one SMP system fails, the others continue to operate. A third advantage of SMP systems is performance, in that SMP speeds up whatever processes can be overlapped. For example, in a desktop computer, SMP can speed up the running of multiple applications simultaneously. If an application is multithreaded, which allows for concurrent operations within the application itself, then SMP can improve the performance of that single application.

Many of today's scalable multi-processor (SMP) systems use the idea of multi-processor nodes (consisting of one or more processors attached to a control/dataflow chipset) interconnected by some form of scalability fabric, such as a serial interconnection. Certain SMP-capable processors used in these systems possess the ability to send inter-processor interrupts to one or more processors logically grouped into clusters on the local node or on remote nodes. These processors also typically transmit information related to the priority level of the task(s) currently running on a given process or thread, which can in turn be used to determine redirection of interrupts to the lowest-priority threads, in order to not impact the performance of high-priority threads. To further complicate matters, a set of processors may be clustered such that not all members of a cluster are resident on one physical node. The problem with this scenario is that without prior knowledge of how these processor groups are organized across node boundaries, interrupts and task priority information must be broadcast to all remote nodes, as well as to the local node, for further processing. Not only does this broadcasting waste valuable scalability bandwidth, but it also forces each node to maintain a relatively large database of all possible combinations of group/cluster identifiers, processor identifiers, home nodes, and task priority levels for all processors in the system. This creates substantial hardware implementation cost for each node in the system, and this problem is likely to grow linearly with the increasing size of such SMP systems.

Thus, a technique is needed to decrease the cost of nodes in a multi-processor system.

SUMMARY

A method, apparatus, system, and signal-bearing medium are provided that, in an embodiment, detect a new task priority for a processor, where the processor is connected to a first node, find a home node for the processor via a cluster to which the processor belongs, and send the new task priority to the home node if the home node is different from the first node. In another embodiment, an interrupt directed to a first processor is detected, the interrupt is determined to be redirectable, a home node for the first process is found via a cluster to which the first processor belongs, and an interrupt vector is sent to the home node if the home node is different from the first node.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
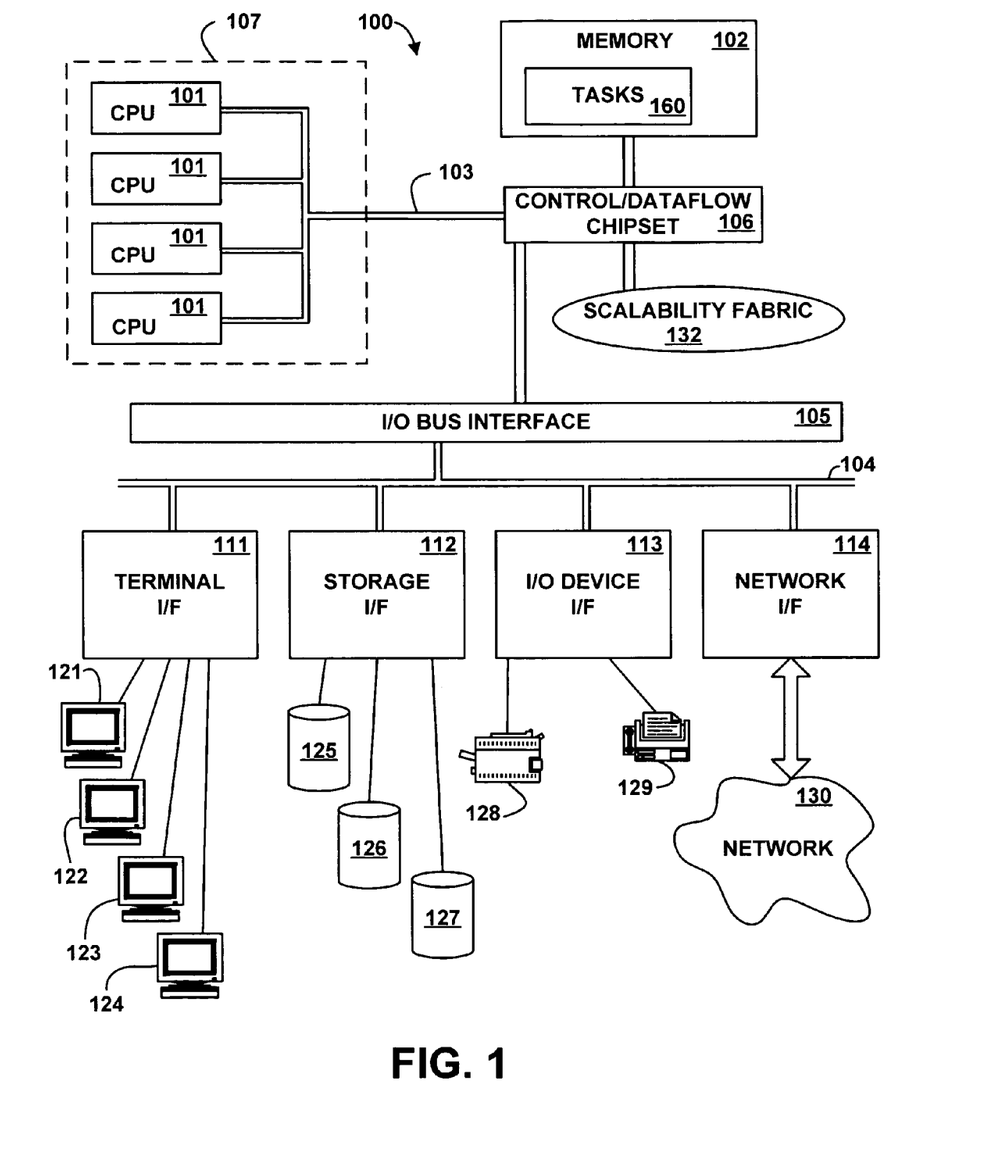
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130 and to scalability fabric 132, according to an embodiment of the present invention. The computer system 100 acts as a node in a multi-node scalable multiprocessor system. In an embodiment, the hardware components of the computer system 100 may be implemented by an IBM eServer iSeries or pSeries computer system. However, those skilled in the art will appreciate that the mechanisms and apparatus of embodiments of the present invention apply equally to any appropriate computing system.

The major components of the computer system 100 include a cluster 107 of one or more processors 101, a main memory 102, a control/dataflow chipset 106, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more programmable central processing units (CPUs) 101. The processors 101 may include general purpose processors, specific purpose processors, and/or state machines and may couple with the control/dataflow chipset 106 via the bus 103 to issue commands such as load and store (read and write) commands to access the memory 102. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In various embodiments, the memory 102 may be any level of cache or main memory. In an embodiment, the memory 102 is implemented as DRAM (Dynamic Random Access Memory), but in other embodiments any appropriate memory technology may be used. The memory 102 includes tasks 160, which may execute on the processor 101.

The control/dataflow chipset 106 includes logic gates and/or other appropriate hardware techniques for implementing the functions as further described below with reference to FIGS. 3A, 3B, 4, 5, and 6. In another embodiment, the control/dataflow chipset 106 may be implemented in microcode or firmware. In another embodiment, the control/dataflow chipset 106 may be implemented in instructions stored in a storage device for execution on the processor 101 or in statements stored in a storage device for interpretation by instructions that execute on the processor 101. The control/dataflow chipset 106 is further described below with reference to FIG. 2.

The memory bus 103 provides a data communication path for transferring data between the processor 101 and the control/dataflow chipset 106. The I/O bus interface unit 105 is coupled to the control/dataflow chipset 106 and the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiments many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path between the processors 101 and the control/dataflow chipset 106, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The scalability fabric 132 connects the computer system 100, acting as a node, to other nodes in a multi-node system. In the various embodiments, the scalability fabric 132 may be implemented via a serial interconnection, Ethernet, a network analogous to the network 130, or via any other appropriate scalability fabric.

FIG. 1 is intended to depict the representative major components of the computer system 100, the network 130, and the scalability fabric 132 at a high level; individual components may have greater complexity than represented in FIG. 1; components other than or in addition to those shown in FIG. 1 may be present; and the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130.

Such tangible signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
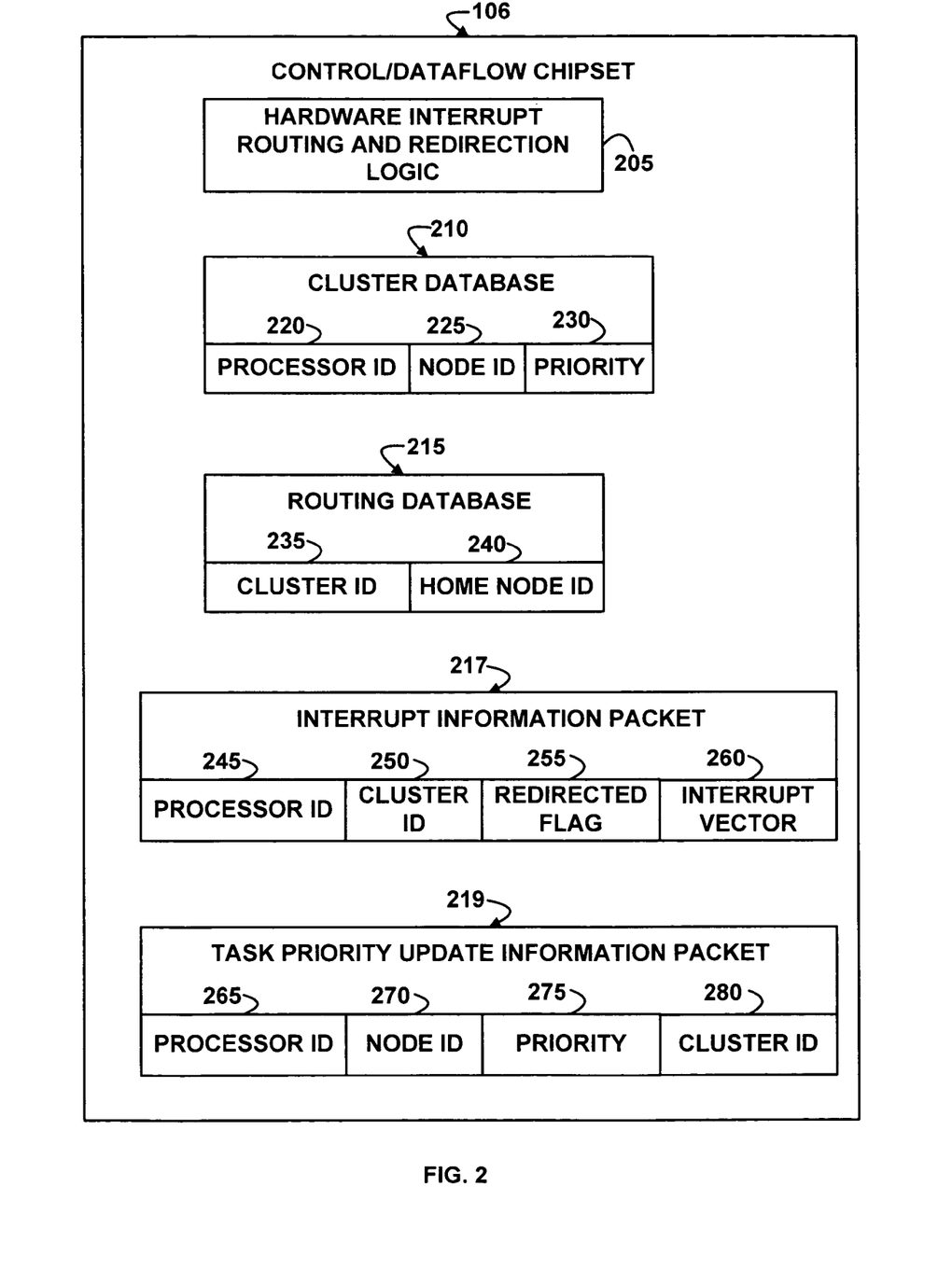
FIG. 2 depicts a block diagram of an example control/dataflow chipset, according to an embodiment of the invention.

FIG. 2 depicts a block diagram of an example control/dataflow chipset 106, according to an embodiment of the invention. The example control/dataflow chipset 106 includes hardware interrupt routing and redirection logic 205, a cluster database 210, a routing database 215, an interrupt information packet 217, and a task priority update information packet 219.

The hardware interrupt routing and redirection logic 205 performs the functions as further described below with reference to FIGS. 3A, 3B, 4, 5, and 6. The cluster database 210 includes a processor identifier field 220, a node identifier field 225 and a priority field 230. Although the cluster database 210 is named a database, in other embodiments, the cluster database 210 may be implemented as memory locations, registers, a table, a file, or any other appropriate storage mechanism. The processor identifier field 220 identifies the processors 101 that are attached or connected to the node 225. The priority field 230 indicates the relative priority of the task 160 current executing at the processor 220. Tasks with a higher relative priority are executed more frequently and/or for longer time periods by the processor 220 than tasks with a lower relative priority.

Although the routing database 215 is named a database, in other embodiments, the routing database 215 may be implemented as memory locations, registers, a table, a file, or any other appropriate storage mechanism. The routing database 215 maps any number of cluster identifiers 235 to home node identifiers 240, where the nodes 100 identified by the home node identifiers 240 are responsible for the clusters 107 identified by the cluster identifiers 235. A home node, which is responsible for a cluster, stores the task priorities 230 for the processors that belong to that cluster, regardless of whether those processors are attached to their home node.

The interrupt information packet 217 includes a processor identifier 245, a cluster identifier 250, a redirected flag 255, and an interrupt vector 260. The processor identifier 245 identifies a processor 101. The cluster identifier 250 identifies a cluster 107 to which the processor 245 belongs. The redirected flag 255 indicates whether the interrupt information packet 217 describes an interrupt that is being redirected to a different processor. The interrupt vector 260 includes an address of an interrupt service routine or interrupt handler. An interrupt is an asynchronous electronic event or signal from a device that is signaled to the processor via an interrupt request (IRQ) that causes the processor to perform a context switch, i.e., the processor sets aside its currently executing task 160 and executes the interrupt service routine or the interrupt handler specified by the interrupt vector 260. In various embodiments, the interrupt may be a timer interrupt, a disk interrupt, a power-off interrupt, a trap, or any other appropriate type of interrupt.

The task priority update information packet 219 includes a processor identifier 265 a node identifier 270, a priority 275, and a cluster identifier 280. The processor identifier 265 identifies a processor 101. The node identifier 270 identifies a node 100 that is responsible for the processor 265. The priority 275 indicates a priority of a task 160 executing on the processor 265. The cluster identifier 280 identifies a cluster 107 to which the processor 265 belongs.

Figure 3A:
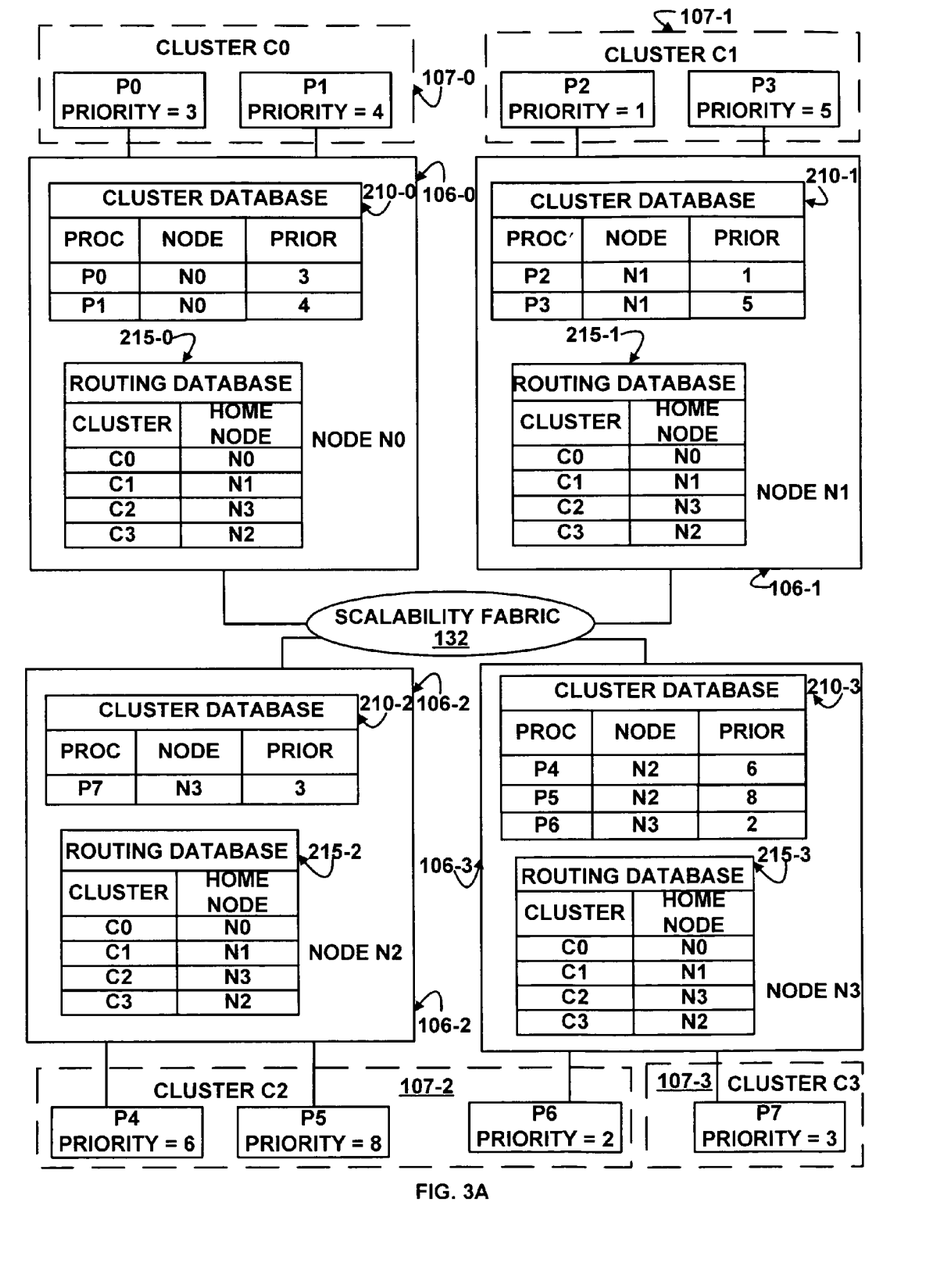
FIG. 3A depicts a block diagram of an example multi-node distributed redirection and routing system, according to an embodiment of the invention.

FIG. 3A depicts a block diagram of an example multi-node distributed redirection and routing system, according to an embodiment of the invention. In this example, each node maintains a maximum of four cluster database entries in its local cluster database, allowing up to four processors worth of past priority information, but in other embodiments any number of cluster database entries and processors may be present. Processors P0 and P1 are attached to node N0, processors P2 and P3 are attached to node N1, processors P4 and P5 are attached to node N2, and processors P6 and P7 are attached to node N3. The processors are clustered such that the processors P0 and P1 are organized in the cluster C0 107-0, processors P2 and P3 are in cluster C1 107-1, processors P4, P5, and P6 are in cluster C2 107-2, and processor P7 is in cluster C3 107-3. The home node for cluster C0 is node N0, which includes the control/dataflow chipset 106-0, the home node for cluster C1 is node N1, which includes the control/dataflow chipset 106-1, the home node for cluster C2 is N3, which includes the control/dataflow chipset 106-3, and the home node for cluster C3 is node N2, which includes the control/dataflow chipset 106-2.

The control/dataflow chipset 106-0 includes the cluster database 210-0 and the routing database 215-0, the control/dataflow chipset 106-1 includes the cluster database 210-1 and the routing database 215-1, the control/dataflow chipset 106-2 includes the cluster database 210-2 and the routing database 215-2, and the control/dataflow chipset 106-3 includes the cluster database 210-3 and the routing database 215-3. The cluster databases 210-0, 210-1, 210-2, and 210-3 are all examples of the cluster database 210 (FIG. 2). The routing databases 215-0, 215-1, 215-2, and 215-3 are all examples of the routing database 215 (FIG. 2). An example task priority level is shown for each processor and which is also stored in the appropriate home node cluster database.

Figure 3B:
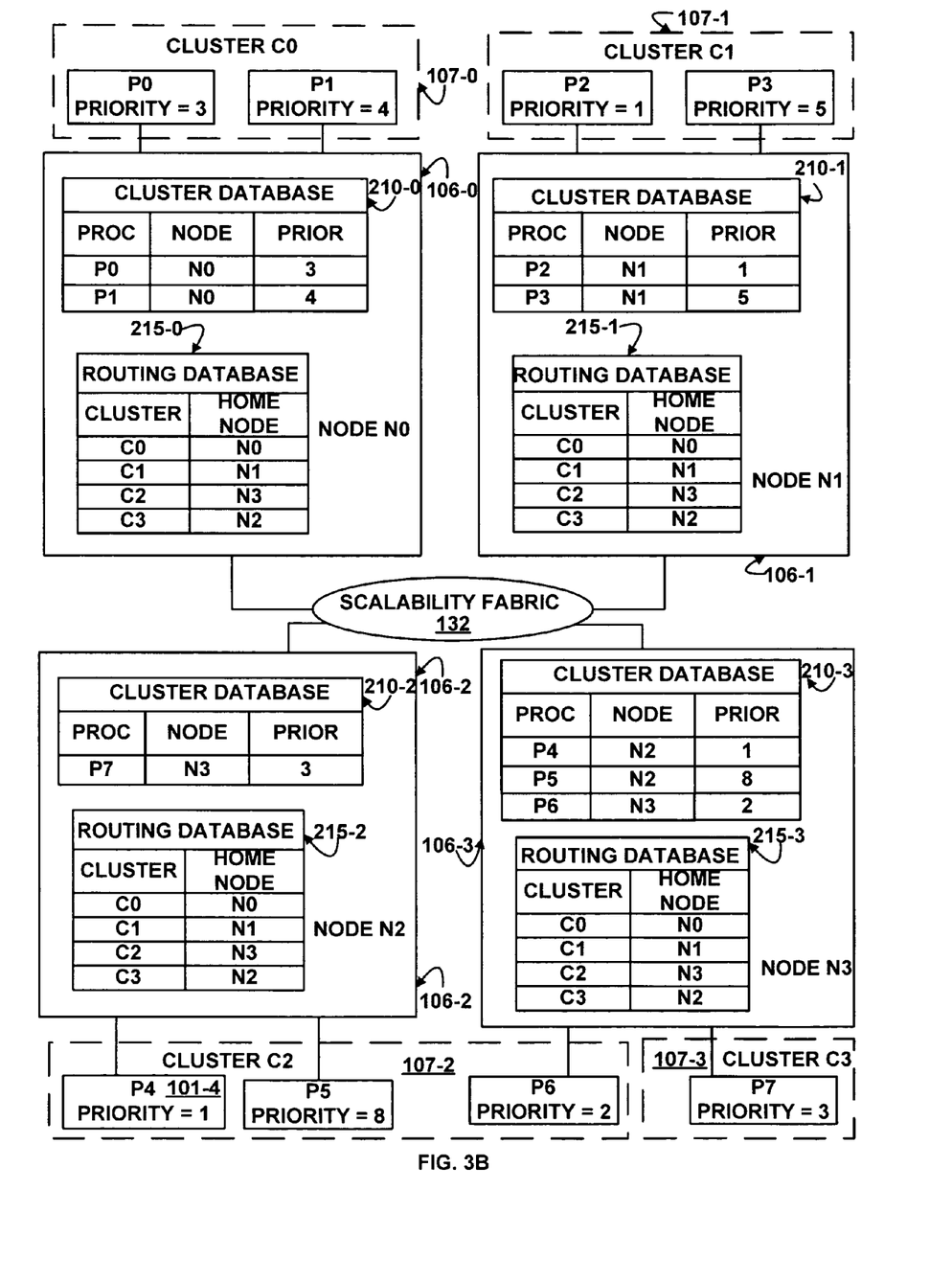
FIG. 3B depicts a block diagram of an example multi-node distributed redirection and routing system after a processor task priority update transaction, according to an embodiment of the invention.

FIG. 3B depicts a block diagram of an example multi-node distributed redirection and routing system after a processor task priority update transaction, according to an embodiment of the invention. In response to the processor P4 101-4 updating its task priority level (from "6" in FIG. 3A to "1" in FIG. 3B), the control/dataflow chipset 106-2 uses the cluster identifier representing the cluster 107-2 (of which the processor P4 101-4 is a member) as an index into the routing database 215-2 to find that the home node 240 (FIG. 2) for the cluster identifier 235 is "N3." The control/dataflow chipset 106-2 then builds and sends the task priority update information packet 219 to the home node N3 for the cluster identifier 235. The control/dataflow chipset 106-3 at the home node N3 receives the task priority update information packet 219 and updates the task priority level 230 for the appropriate processor 101-4 in the home node's cluster database 210-3 (from "6" in FIG. 3A to "1" in FIG. 3B).

Figure 4:
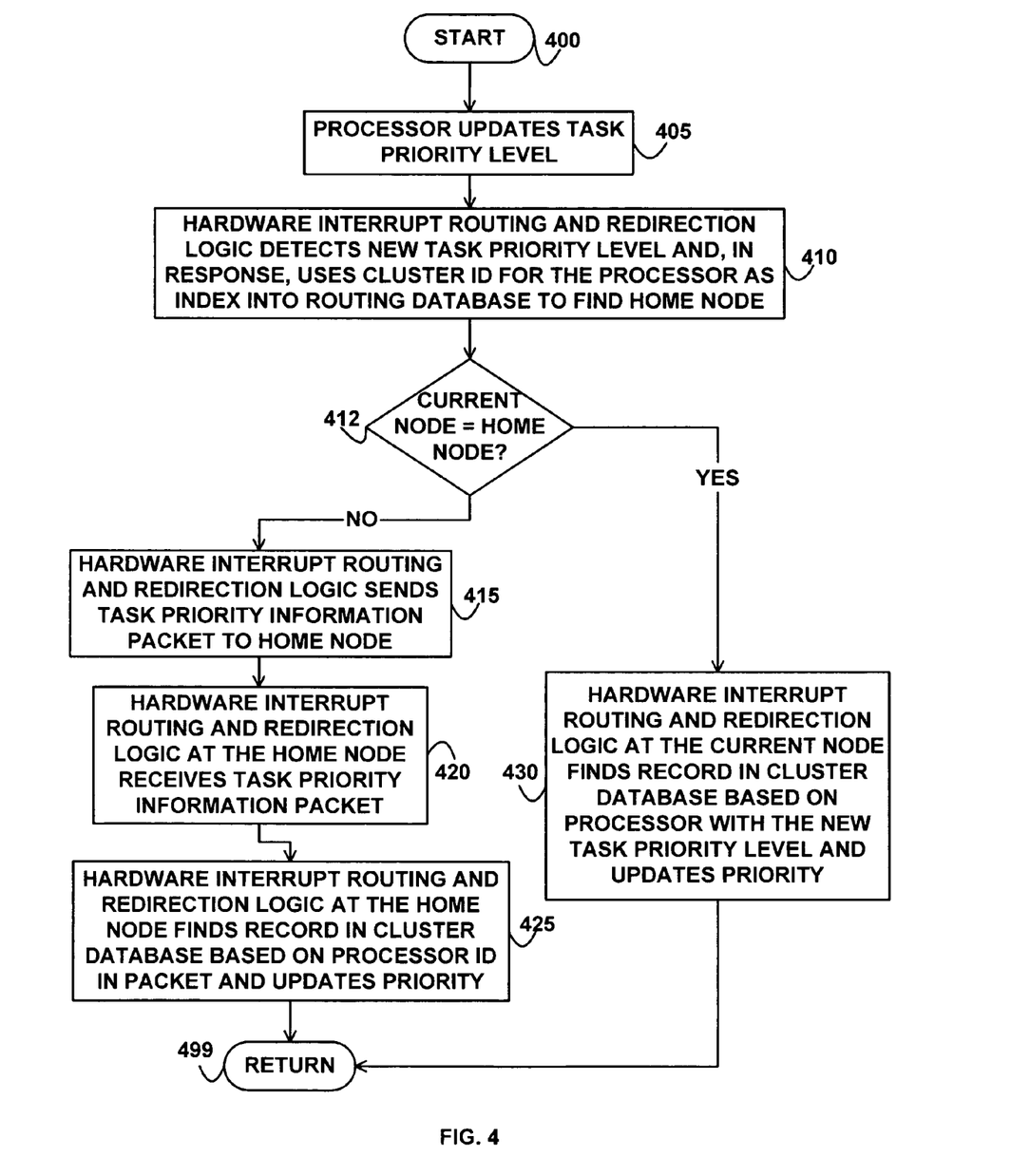
FIG. 4 depicts a flowchart of a example processing for a processor task priority update transaction, according to an embodiment of the invention.

FIG. 4 depicts a flowchart of a example processing for a processor task priority update transaction, according to an embodiment of the invention. Control begins at block 400. Control then continues to block 405 where the processor 101 updates the task priority level. In various embodiments, the task priority level may be changed in response to a task switch or in response to a changing of the priority of the executing task. Control then continues to block 410 where the hardware interrupt routing and redirection logic 205 at the node 100 uses an identifier of a cluster 107 that contains the processor 101 whose task priority changed as an index into the routing database 215 to find the home node 240 for the cluster 107 via the cluster identifier field 235.

Control then continues to block 412 where the hardware interrupt routing and redirection logic 205 determines whether the current node (the node containing the hardware interrupt routing and redirection logic 205) is the home node 240 previously determined at block 410.

If the determination at block 412 is false, then control continues to block 415 where the hardware interrupt routing and redirection logic 205 builds the task priority update information packet 219. The hardware interrupt routing and redirection logic 205 sets the processor identifier 265 in the task priority update information packet 219 to identify the processor 101 that is executing the task 160 whose priority changed. The hardware interrupt routing and redirection logic 205 sets the node identifier 270 in the task priority update information packet 219 to identify the home node 240 previously found at block 410. The hardware interrupt routing and redirection logic 205 sets the priority field 275 in the task priority update information packet 219 to identify the new priority. The hardware interrupt routing and redirection logic 205 sets the cluster identifier 280 in the task priority update information packet 219 to identify the cluster 107 that contains the processor 101 whose task priority changed. The hardware interrupt routing and redirection logic 205 further sends the built task priority update information packet 219 to the node 100 identified by the home node field 240.

Control then continues to block 420 where the hardware interrupt routing and redirection logic 205 at the home node receives the task priority update information packet 219 that was previously sent at block 415. Control then continues to block 425 where the hardware interrupt routing and redirection logic 205 at the home node finds a record in its cluster database 210 using the processor identifier 265 in the task priority update information packet 219 as in index into the processor identifier field 220 of the cluster database 210. The hardware interrupt routing and redirection logic 205 at the home node further updates the priority 230 in the found record in the cluster database 210 with the priority 275 from the task priority update information packet 219. Thus, the hardware interrupt routing and redirection logic 205 associates the new task priority with the processor identifier in the cluster database 210 of the home node for the cluster 107 to which the processor 101 belongs. Control then continues to block 499 where the logic of FIG. 4 returns.

If the determination at block 412 is true, then control continues form block 412 to block 430 where the hardware interrupt routing and redirection logic 205 at the home node (the home node is the current node) finds a record in the cluster database 210 based on the processor 101 with the new task priority level via the processor identifier 220 and updates the priority 230. Control then continues to block 499 where the logic of FIG. 4 returns.

Figure 5:
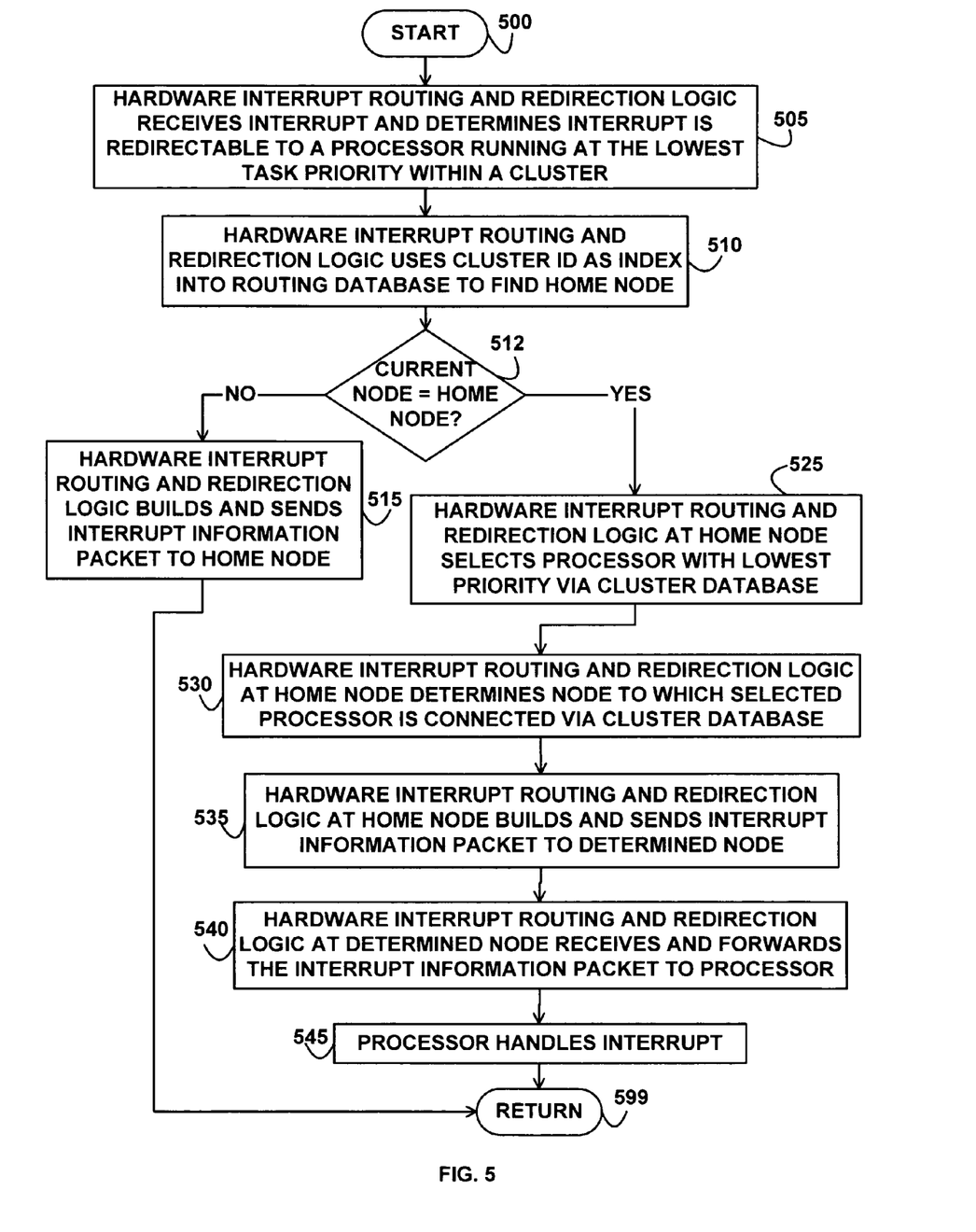
FIG. 5 depicts a flowchart of a example processing for an interrupt transaction, according to an embodiment of the invention.

FIG. 5 depicts a flowchart of a example processing for an interrupt transaction, according to an embodiment of the invention. Control begins at block 500. Control then continues to block 505 where the hardware interrupt routing and redirection logic 205 receives an interrupt and determines that the interrupt is redirectable to a processor running at the lowest task priority within a cluster 107. In various embodiments, the hardware interrupt routing and redirection logic 205 may receive the interrupt from the processor 101 or from the terminal interface 111, the storage interface 112, the I/O device interface 113, or the network interface 114.

Control then continues to block 510 where the hardware interrupt routing and redirection logic 205 at the node 100 uses an identifier of a cluster 107 that contains the interrupted processor 101 as an index into the routing database 215 to find the home node 240 for the cluster 107 via the cluster identifier field 235.

Control then continues to block 512 where the hardware interrupt routing and redirection logic 205 determines whether the current node (the node containing the hardware interrupt routing and redirection logic 205) is the home node 240 previously determined at block 510.

If the determination at block 512 is false, then control continues to block 515 where the hardware interrupt routing and redirection logic 205 builds the interrupt information packet 217. The hardware interrupt routing and redirection logic 205 sets the processor identifier 245 in the interrupt information packet 217 to identify the processor 101 that was interrupted by the interrupt. The hardware interrupt routing and redirection logic 205 sets the cluster identifier 250 in the interrupt information packet 217 to identify the cluster 107 that contains the interrupted processor. The hardware interrupt routing and redirection logic 205 sets the redirected flag 255 in the interrupt information packet 217 to indicate that the interrupt is redirected. The hardware interrupt routing and redirection logic 205 sets the interrupt vector field 260 in the interrupt information packet 217 to the vector associated with the interrupt. The hardware interrupt routing and redirection logic 205 further sends the built interrupt information packet 217 to the home node previously found at block 510. Control then continues to block 599 where the logic of FIG. 5 returns.

If the determination at block 512 is true, then control continues from block 512 to block 525 where the hardware interrupt routing and redirection logic 205 selects the processor identifier 220 with the lowest priority 230 via the cluster database 210 and stores the processor identifier 220 with the lowest priority 230 in the processor identifier 245 of the interrupt information packet 217.

Control then continues to block 530 where the hardware interrupt routing and redirection logic 205 at the home node determines the node 225 to which the selected processor 220 with the lowest priority 230 is connected via the cluster database 210. Control then continues to block 535 where the hardware interrupt routing and redirection logic 205 at the home node builds and sends the interrupt information packet 217 to the node 225 previously determined at block 530. Control then continues to block 540 where the hardware interrupt routing and redirection logic 205 at the determined node receives the interrupt information packet 217 and forwards it to the processor 245 identified in the received interrupt information packet 217. Control then continues to block 545 where the processor 245 handles or processes the interrupt vector 260, including executing the instructions specified by the interrupt vector 260. Control then continues to block 599 where the logic of FIG. 5 returns.

Figure 6:
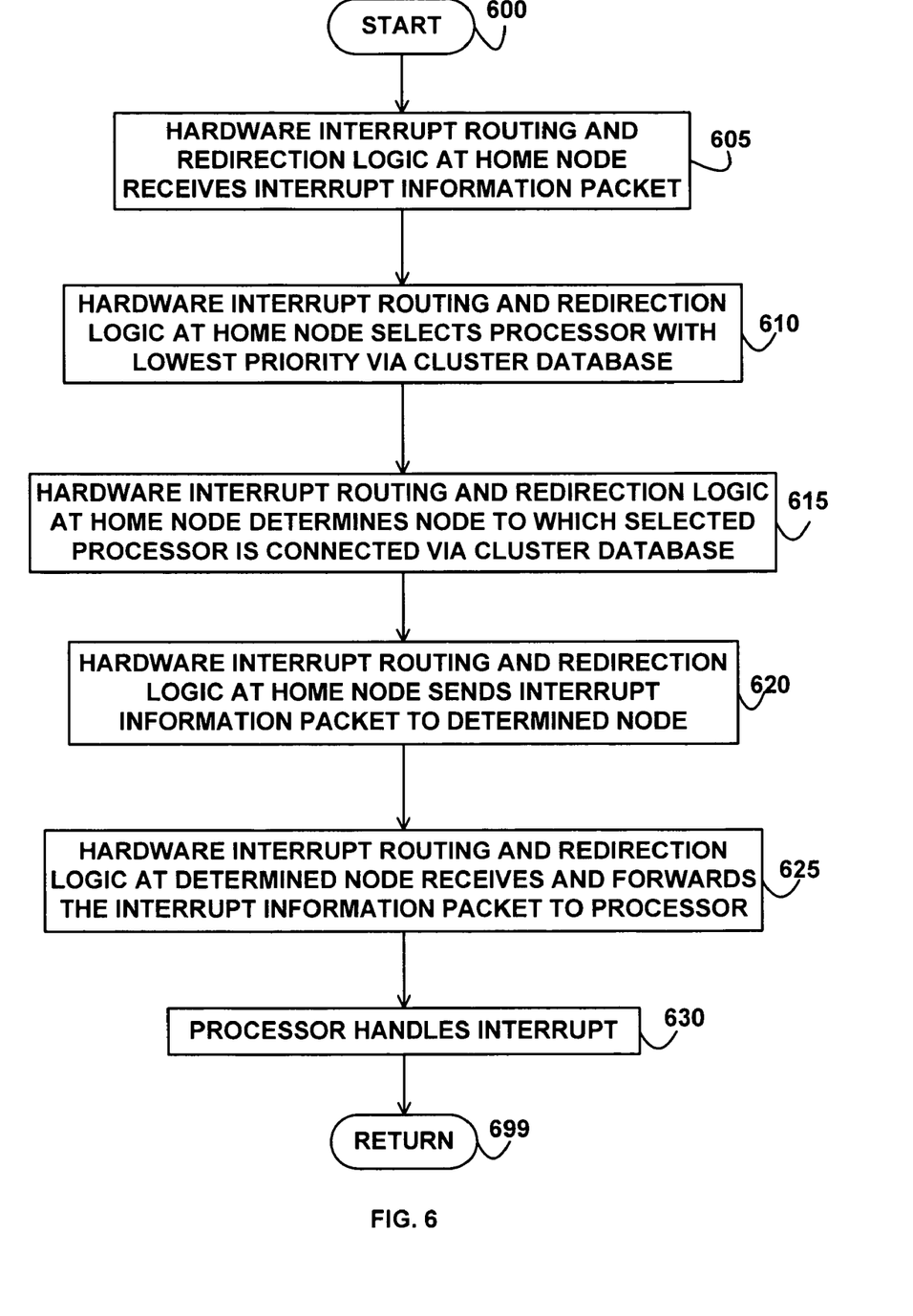
FIG. 6 depicts a flowchart of a example processing for an interrupt information packet at a home node, according to an embodiment of the invention.

FIG. 6 depicts a flowchart of a example processing for an interrupt information packet 217 at a home node, according to an embodiment of the invention. Control begins at block 600. Control then continues to block 605 where the hardware interrupt routing and redirection logic 205 at the home node receives the interrupt information packet 217 that was previously sent at block 515 (FIG. 5). Control then continues to block 610 where, in response to the redirected flag 255 in the interrupt information packet 217, the hardware interrupt routing and redirection logic 205 selects the processor 220 with the lowest priority 230 via the cluster database 210 and stores the processor identifier 220 with the lowest priority 230 in the processor identifier 245 of the interrupt information packet 217.

Control then continues to block 615 where the hardware interrupt routing and redirection logic 205 at the home node determines the node 225 to which the selected processor 220 with the lowest priority 230 is connected via the cluster database 210. Control then continues to block 620 where the hardware interrupt routing and redirection logic 205 at the home node sends the interrupt information packet 217 to the node 225 previously determined at block 615. Control then continues to block 625 where the hardware interrupt routing and redirection logic 205 at the determined node receives the interrupt information packet 217 and forwards it to the processor 245 identified in the received interrupt information packet 217. Control then continues to block 630 where the processor 245 handles or processes the interrupt vector 260, including executing the instructions specified by the interrupt vector 260. Control then continues to block 699 where the logic of FIG. 6 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   detecting a new task priority for a processor, wherein the processor is connected to a first node, and wherein the detecting the new task priority for the processor comprises detecting that a priority of a task tat is currently executing on the processor is changed to the new task priority, wherein the priority of the task is relative to a plurality of priorities of other tasks that execute on the processor;

finding a home node for the processor via a cluster to which the processor belongs; and sending the new task priority to the home node if the home node is different from the first node.

2. The method of claim 1, further comprising:

receiving the new task priority at the home node; and storing the new task priority at the home node.

3. The method of claim 2, further comprising:

storing the new task priority at the home node if the home node is identical to the first node.

4. The method of claim 2, wherein the sending further comprises:

sending an identification of the processor to the home node.

5. The method of claim 4, wherein the storing further comprises:

associating the new task priority with the identification of the processor at the home node.

6. The method of claim 1, wherein the home node and the first node are connected via a scalability fabric.

7. The method of claim 1, wherein the home node is responsible for the cluster.

8. A method for configuring a computer, comprising:

configuring the commuter to detect a new task priority for a third processor, wherein the third processor is connected to a third node, and wherein the configuring the computer to detect the new task priority for the third processor comprises configuring the computer to detect that a priority of a task that is currently executing on the third processor is changed to the new task priority, wherein the priority of the task is relative to a plurality of priorities of other tasks that execute on the third processor;

configuring the computer to find a home node for the third processor via a cluster to which the third processor belongs;

configuring the computer to send the new task priority to the home node for the third processor if the home node for the third processor is different from the third node;

configuring the computer to detect an interrupt directed to a first processor, wherein the first processor is connected to a first node;

configuring the computer to determine that the interrupt is redirectable;

configuring the computer to find a home node for the first processor via a cluster to which the first processor belongs; and configuring the computer to send an interrupt vector to the home node for the first processor if the home node for the first processor is different from the first node.

9. The method of claim 8, further comprising:

configuring the computer to receive the interrupt vector at the home node; and configuring the computer to select a second processor with a lowest task priority in the cluster.

10. The method of claim 9, further comprising:

configuring the computer to determine a second node to which the second processor is connected.

11. The method of claim 10, further comprising:

configuring the computer to send the interrupt vector to the second node.

12. The method of claim 11, further comprising:

configuring the computer to process the interrupt vector at the second node.

13. The method of claim 8, wherein the computer comprises the home node, the first node, and the second node, and wherein the home node, the first node, and the second node are connected via a scalability fabric.

* * * * *